United States Patent [19]

Hamamoto et al.

[11] Patent Number: 4,940,322
[45] Date of Patent: Jul. 10, 1990

[54] ELECTRIC REARVIEW MIRROR SYSTEM FOR MOTOR VEHICLE

[75] Inventors: Tadanao Hamamoto; Tadashi Wakiya; Kazunari Hayasi, all of Aichi, Japan

[73] Assignee: Kabushiki Kaisha Tokai Rika Denki Seisakusho, Aichi, Japan

[21] Appl. No.: 261,852

[22] Filed: Oct. 25, 1988

[30] Foreign Application Priority Data

Oct. 26, 1987 [JP] Japan .................. 62-163227
Nov. 18, 1987 [JP] Japan .................. 62-175998

[51] Int. Cl.⁵ .......................... B60R 1/08; G02B 7/18; G05B 11/00; G08C 15/06
[52] U.S. Cl. .................................. 350/637; 350/604; 350/633; 364/238; 367/10.1
[58] Field of Search ............... 350/637, 636, 632, 633, 350/634, 604, 605; 318/562; 307/10.1; 364/238

[56] References Cited

U.S. PATENT DOCUMENTS 3,864,578  2/1975  Lackey ................. 340/870.15
4,267,494  5/1981  Matsuoka et al. ........... 307/10.1
4,564,757  1/1986  LaBudde et al. ............ 250/239
4,791,311 12/1988  Vig ......................... 370/85
4,798,967  1/1987  Yamana et al. ............. 307/10.1

FOREIGN PATENT DOCUMENTS 102734  8/1979  Japan ..................... 350/637
218452  9/1986  Japan ..................... 350/604

Primary Examiner—Jon W. Henry
Attorney, Agent, or Firm—Finnegan, Henderson, Farabow, Garrett, and Dunner

[57] ABSTRACT

An electric rearview mirror system for a motor vehicle, in which drive mechanism, which have a function of turning the mirrors of the mirror units of said system and a function of moving the case of said units back and forth between a use position and a put-away position, are provided in said cases housing said mirrors, so that said mechanisms are operated in prescribed manners by a plurality of kinds of command signals supplied from manipulation means provided in the body of said vehicle, characterized by comprising a transmission means provided in the body of said vehicle to convert said command signals into serial signals and transmit said serial signals to said mirror units through electric wires; and control means provided in said cases to operate said drive mechanisms in said prescribed manners on the basis of said serial signals received by said control means from said wires.

8 Claims, 4 Drawing Sheets

ELECTRIC REARVIEW MIRROR SYSTEM FOR MOTOR VEHICLE

BACKGROUND OF THE INVENTION

The present invention relates to an electric rearview mirror system for a motor vehicle, in which the angles of the mirrors of mirror units of the system can be changed under remote control by one seated in the driver's seat of the vehicle. Cases housing the mirrors can be moved back and forth between a use position and a put-away position under remote control by one seated in the driver's seat.

Many aspects of the motor vehicle have recently been improving. As part of the improvements, there has been a widespread trend in electrifying the door-attached rearview mirror systems. In a conventional rearview mirror system of this type, a mirror is rotatably supported in a case rotatably supported by a shaft on the door of the motor vehicle. A drive mechanism including a first electric motor for turning the mirror up and down, a second electric motor for turning the mirror right and left, and a third electric motor for moving the case back and forth between a use position and a put-away position is provided in the case. A switch means, which is manipulated by the driver of the vehicle, is provided in the driver's area of the vehicle so that a plurality of kinds of command signals, which are electrical current signals for directly driving the electric motors, are selectively sent out by the switch means to turn the mirror up and down and right and left and move the case between the use position and the put-away position. The switch means and the drive mechanisms are connected to each other through an electric cord composed of a plurality of electric wires, through which the command signals are transmitted from the switch means to the drive mechanism. In order to turn the case properly, the shaft supporting the case is located at the center of the turning thereof and made hollow so that the electric cord is laid through the shaft.

When the angle of the mirror is to be adjusted prior to moving the vehicle into a garage or to the side of a road, or when a different driver is in the driver's seat, etc., the mirror can be turned to a desired position by manipulating the switch means. However, the mirror turned to the new position, needs to be returned to the original position after the vehicle is removed from the garage or from the side of the road, or when the original driver is seated again, etc. Since it would be troublesome to perform manipulation to return the mirror to the original position, the normal position of the mirror is stored in advance to automatically return the mirror to the stored normal position by the one-shot manipulation of a return switch provided in the driver's area of the vehicle.

To accomplish this, the mirror case houses a position sensor for detecting the position of the mirror, a memory means for storing data including the results of detection of the position sensor corresponding to the normal position of the mirror, and a control means for regulating the drive mechanism on the basis of the detection output from the position sensor, the stored contents in the memory means, and a return command signal from the return switch. The switch means and the return switch are located in the body of the motor vehicle. The drive mechanism and the control means are located in the mirror case. These are connected to each other through an electric cord made of a plurality of electric wires. A plurality of command signals from the switch means and the return switch are transmitted to the drive mechanism and the control means through the electric cord.

Since the number of the electric wires that make up the electric cord of the conventional electric rearview mirror system is large due to different large number of the kinds of the command signals, the outside diameter of electric cord is also large. For that reason, the case, into which the cord is laid, and the shaft supporting the case also needs to be made large. As a result, the design of the motor vehicle is likely to be restrained, creating a design problem.

Moreover, there is another in problem that the presence of the electric cord increases the complexity of manufacturing the mirror system.

SUMMARY OF THE INVENTION

The present device was made in order to solve the above-mentioned problems.

Accordingly, it is an object of the present device to provide an electric rearview mirror system for a motor vehicle, in which the mirrors of the mirror units of the system can be turned under remote control from the driver's area of the vehicle, the mirror cases of the units can be moved back and forth between a use position and a put-away position under remote control from the driver's area, and the number of electric wires for connecting each mirror unit to the interior of the body of the vehicle is reduced to make the mirror case compact.

It is another object of the present device to: provide an electric rearview mirror system for a motor vehicle in which the number of electric wires necessary to connect each mirror unit of the system to the interior of the body of the vehicle can be reduced despite the large number of the functions of the system, to improve the manufacturing property of the system and, make the case mirror unit, compact; and to require that only one memory means needs to be provided for the whole motor vehicle to store the positions of the mirrors of the mirror units of the system, thus diminishing the cost of production of the system.

In the electric rearview mirror system provided in accordance with the present device, drive mechanisms which have a function of turning the mirrors and moving the mirror cases between the use position and the put-away position are provided in the cases housing the mirrors. The drive mechanisms are operated in prescribed manners by a plurality of kinds of command signals supplied from manipulation means provided in the body, of the motor vehicle. The mirror system is comprised of a transmission means provided in the body of the motor vehicle to convert the plurality of kinds of command signals into serial signals these serial signals are then transmitted to the mirror units through the electric wires. The mirror system is also made up of control means provided in the mirror cases to operate the drive mechanisms in the prescribed manners on the basis of the serial signals received by the control means through the electric wires.

Since the plurality of kinds of command signals are the serial signals which are sent from the interior of the body of the motor vehicle to each mirror unit of the electric rearview mirror system, only one electric wire need be laid to transmit the signals from the interior of the vehicle body to the mirror unit. Only two other electric wires need to be laid from the interior of the body of the motor vehicle to the mirror unit to supply electric power to the drive mechanism and the control means provided in the mirror case. As a result, the number of the electric wires necessary for each mirror unit of the system is made small.

DESCRIPTION OF THE PREFERRED EMBODIMENTS

Embodiments of the present device will be described with reference to the attached drawings.

Figure 1:
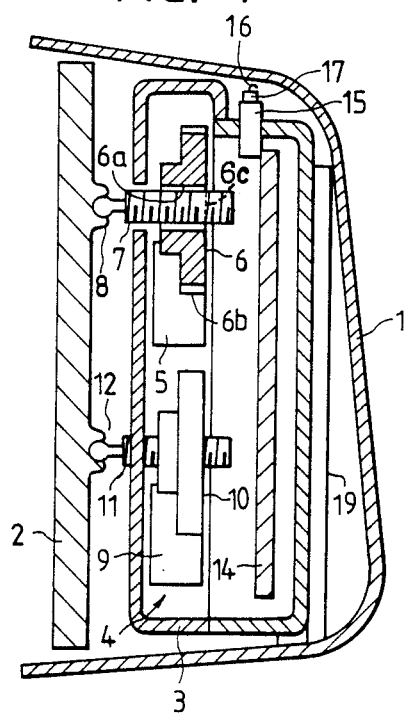
FIG. 1 shows a longitudinally sectional view of the right-hand door mirror unit of the mirror system, which is a first embodiment of the present invention.
Figure 2:
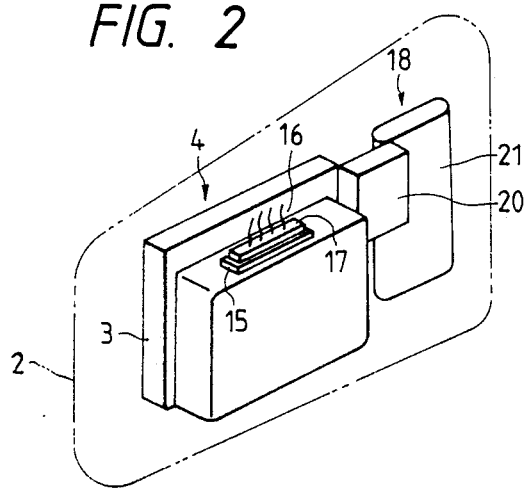
FIG. 2 shows a perspective view of a major part of the mirror unit.
Figure 3:
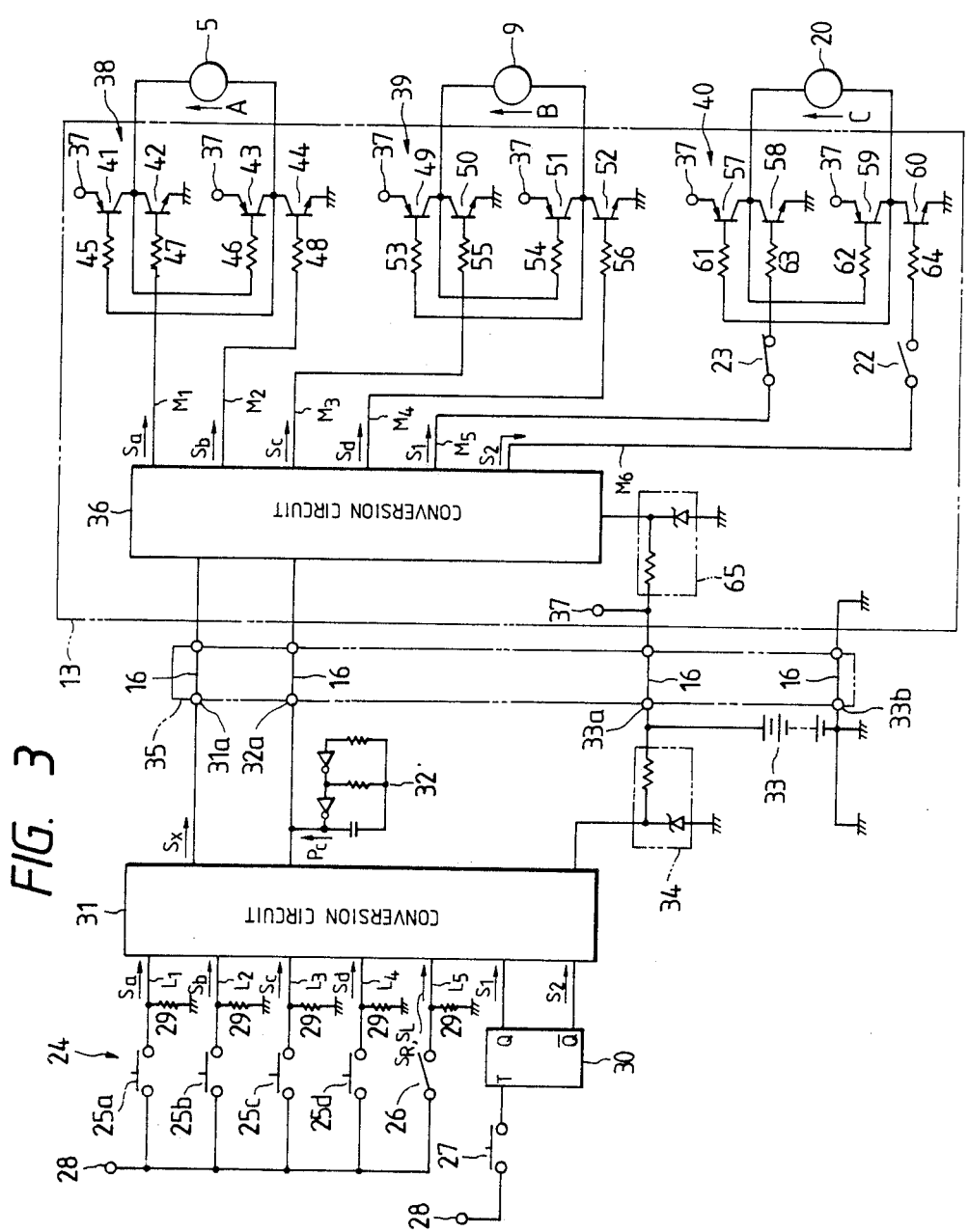
FIG. 3 shows an electric wiring diagram of the electric rearview mirror system, which is the first embodiment of the present invention.

FIGS. 1, 2 and 3 show an electric rearview mirror system which is a first embodiment. Since the construction and operation of the right-hand door mirror unit of the mirror system are symmetric to those of the left-hand door mirror unit, this description will mainly concern the right-hand door mirror unit attached to the right-hand door of a motor vehicle. As shown in FIGS. 1 and 2, the right-hand door mirror unit includes a case 1 rotatably supported by a hollow support shaft (not shown in the drawings) secured to the door of the motor vehicle and extending upward, a mirror 2 housed in the case and rotatably supported at the central portion of the rear of the mirror by a supporting universal joint (not shown in the drawings) on a housing 3 provided in the case, and a mirror drive mechanism 4 provided in the housing.

The mirror drive mechanism 4 includes a first electric motor 5 for turning the mirror 2 up and down, and a gear board 6, which is rotated by the electric motor and includes an external gear 6b having a circular hole 6a and an annular spring 6c attached to the external gear across the circular hole so that the spring can be deformed to open. The external gear 6b is engaged with a drive gear provided at the side of the motor 5 and not shown in the drawings.

The mechanism 4 also includes a first screw rod 7 engaged with the spring 6c and extending through the circular hole 6a and the spring so that the first screw rod is moved back and forth in the axial direction. The gear board 6 is rotated backward and forward by the first electric motor 5. The first screw rod 7 is rotatably coupled to the rear end of the mirror 2 over the supporting universal joint by a coupling universal joint 8 so that the mirror is turned up and down when the first screw rod is moved back and forth along with the backward and forward rotation of the first electric motor 5. The mechanism 4 also includes a second electric motor 9 for turning the mirror 2 right and left, a gear board 10, which is rotated by the motor and constructed in the same manner as the gear board 6, and a second screw rod 11 related to the gear board 10 in the same manner as the first screw rod 7 and the gear board 6 so that the second screw rod is moved back and forth in the axial direction as the gear board 10 is rotated backward and forward by the second electric motor 9. The second screw rod 11 is rotatably coupled to the rear end of the mirror 2 at the left of the supporting universal joint by a coupling universal joint 12 so that the mirror is turned right and left as the second screw rod is moved back and forth along with the backward and forward rotation of the second electric motor 9.

A printed circuit board 14 having a motor control circuit 12 is provided in the housing 3 in addition to the mirror drive mechanism 4. A socket 15 electrically coupled to the printed circuit board 14 is provided in the housing 3 and electrically connected to a plug 17 connected with a necessary number (four, for example) of electric wires 16.

A mirror put-away drive mechanism 18 is housed in the case 1. The mechanism 18 includes a third electric motor 20 secured to a bracket 19 supporting the housing 3 and integrated with the case 1 as shown in FIG. 1, and a motive power transmission means 21 coupled to the third electric motor. The means 21 includes a speed reduction gear train, which is driven by the third electric motor 20 and coupled at the final transmission part of the train to a clutch coupled to the hollow support shaft by which the case 1 is rotatably supported. The hollow support shaft is secured so that the case 1 is turned back and forth as the third electric motor 20 is rotated backward and forward. A return detection switch 22 (shown in FIG. 3) is turned off only when the case 1 is turned to a use position in which the case projects sideward from the door of the motor vehicle. A put-away detection switch 23 (shown in FIG. 3) is turned off only when the case is turned to a put-away position in which the case extends nearly in parallel with the door of the vehicle. Both of these switches are provided in the mirror put-away drive mechanism 18.

The electric circuit configuration of the electric rearview mirror system is now described with reference to FIG. 3. A switch means 24 is provided on the dashboard of the motor vehicle to manipulate the mirror units of the mirror system. The switch means 24 includes self-reset mirror switches $25a$, $25b$, $25c$ and $25d$ for selectively turning the mirror 2 of the right-hand door mirror unit and that of the left-hand door mirror unit up and down, and right and left. Also included in switch means 24 are a self-sustained changeover switch 26 for enabling the turning of the mirror 2 of the right-hand door mirror unit or that of the mirror of the left-hand door mirror unit, and self-reset put-away switch 27 for turning the case 1 of the right-hand door mirror unit and that of the case of the left-hand door mirror unit between the put-away position and the use position. One terminal of each of the mirror switches $25a$, $25b$, $25c$ and $25d$ and the changeover switch 26 is connected to a power supply terminal 28 for +5 V in potential. The other terminals of the switches are connected to signal lines $L_1$, $L_2$, $L_3$, $L_4$ and $L_5$ grounded through resistors 29. Turn-on signals Sa, Sb, Sc and Sd, which are high level command signals, are sent out to the signal lines $L_1$, $L_2$, $L_3$ and $L_4$ when the mirror switches $25a$, $25b$, $25c$ and $25d$ respectively are turned on.

A right-hand door mirror unit selecting signal SR, which is a high-level command signal, is sent out to the signal line $L_5$ when the changeover switch 26 is turned on. A left-hand door mirror unit selection signal SL, which is a low-level command signal, is sent out to the signal line $L_5$ when the changeover switch 26 is turned off. One terminal of the put-away switch 27 is connected to the power supply terminal 28 and the other terminal is connected to the trigger terminal T of a T-type flip-flop 30, such that the output from the flip-flop is inverted every time the put-away switch is turned on. At the time of the inversion, a high-level signal is sent out as a put-away command signal $S_1$ from the non-inversion output terminal Q of the flip-flop 30, or a high-level signal is sent out as a return command signal $S_2$ from the inversion output terminal Q of the flip-flop.

A parallel-serial conversion circuit 31 is provided as a transmission means to receive the signals from the signal lines $L_1$, $L_2$, $L_3$, $L_5$ and $L_5$ and the flip-flop 30, and includes a shift register. The signals received by the circuit 31 are entered in parallel with each other into the circuit so that the signals are converted into serial signals Sx in a sequence determined on the basis of clock pulses Pc supplied from an oscillation circuit 32, and the serial signals are repeatedly sent out from the parallel-serial conversion circuit. The conversion circuit 31 is supplied with electric power from a vehicle-mounted battery 33 through a constant voltage circuit 34.

The motor control circuit 13 is connected to the output terminal 31a of the parallel-serial conversion circuit 31, the output terminal 32a of the oscillation circuit 32 and the output terminals of the battery 33 through an electric cord 35, including the electric cord 16 and the plug 17, and laid through the hollow support shaft not shown in the drawings. The motor control circuit 13 includes a serial-parallel conversion circuit 36 composed of a shift register and a latch circuit to receive the serial signals Sx and the clock pulses Pc. The received serial signals Sx are converted back into the parallel signals by the circuit 36 on the basis of the received clock pulses Pc, and the parallel signals are sent out from the circuit to lines $M_1$, $M_2$, $M_3$, $M_4$, $M_5$ and $M_6$. Specifically, the turn-on signals Sa, Sb, Sc and Sd are sent out from the conversion circuit 36 to the lines $M_1$, $M_2$, $M_3$ and $M_4$, respectively, and the put-away command signal S1 and the return command signal S2 are sent out from the conversion circuit to the lines $M_5$ and $M_6$, respectively. ,The output of the signals $S_1$ and $S_2$ is latched. When the serial signals Sx do not include a factor corresponding to the right-hand door mirror unit selection signal SR, the conversion of factors corresponding to the turn-on signals Sa, Sb, Sc and Sd is stopped so that low-level signals are always sent out to the lines $M_1$, $M_2$, $M_3$ and $M_4$.

The motor control circuit 13 also includes a power supply terminal 37 connected to the output terminal 33a of the vehicle-mounted battery 33 through the electric cord 35, a grounded terminal connected to the other output terminal 33b of the battery through the cord, a drive circuit 38 for driving the first electric motor 5, a drive circuit 39 for driving the second electric motor 9, and a drive circuit 40 for driving the third electric motor 20.

In the drive circuit 38, a series circuit composed of the emitter and collector of a PNP transistor 41 and the collector and emitter of an NPN transistor 42, and a series circuit composed of the emitter and collector of a PNP transistor 43 and the collector and emitter of an NPN transistor 44, are connected between the power supply terminal 37 and the grounded terminal. The first electric motor 5 is connected between the collectors of the transistor 41 and the transistor 43. The base of the transistor 41 is connected to the collector of the transistor 44 through a resistor 45. The base of the transistor 43 is connected to the collector of the transistor 42 through resistor 46. The base of the transistor 42 is connected to the line $M_1$ through a resistor 47. The base of the transistor 44 is connected to the line $M_2$ through a resistor 48. When an electrical current in a direction A shown in FIG. 3 is supplied to the first electric motor 5, the motor is rotated forward so that the mirror 2 is turned up. When electrical current in a direction reverse to A is supplied to the first electric motor 5, the motor is rotated back so that the mirror 2 is turned down.

In the drive circuit 39, the second electric motor 9, transistors 49, 50, 51, and 52 and resistors 53 and 54 are connected between the power supply terminal 37 and the ground terminal in the same manner as the drive circuit 38, and the base of the transistors 50 and 52 are connected to the lines $M_3$ and $M_4$ through resistors 55 and 56, respectively. When an electrical current in directions B shown in FIG. 3 is supplied to the second electric motor 9, the motor is rotated forward so that the mirror 2 is turned left. When an electrical current in a direction reverse to that B is supplied to the seconds electric motor 9, the motor is rotated backward so that the mirror 2 is turned right.

In the drive circuit 40, the third motor 20, transistors 57, 58, 59 and 60 and resistors 61 and 62 are connected between the power supply terminal 37 and the ground terminal in the same manner as the drive circuit 38. The base of the transistor 58 is connected to the line $M_5$ through a resistor 63 and the put-away detection switch 23. The base of the transistor 60 is connected to the line $M_6$ through a resistor 64 and the return detection switch 22. When an electrical current in a direction C shown in FIG. 3 is supplied to the third electric motor 20, the motor is rotated forward so that the case 1 is turned toward the put-away position. When an electrical current in a direction reverse to that C is supplied to the third electric motor 20, the motor is rotated backward so that the case 1 is turned toward the use position.

The serial-parallel conversion circuit 36 is supplied with electric power from the vehicle-mounted battery 33 through a constant voltage circuit 65.

A motor control circuit and an electric cord for the left-hand door mirror unit are the same in construction as the motor control circuit 13 and the electric cord 35 for the right-hand door mirror unit. However, the serial-parallel conversion circuit of the motor control circuit for the left-hand door mirror unit operates so that the conversion of factors corresponding to the turn-on signals Sa, Sb, Sc and Sd is topped when the serial signals Sx received by the conversion circuit through the electric cord do not include a factor corresponding to the left-hand door mirror unit selection signal SL.

The operation of the electric rearview mirror system is now described in detail. The parallel signals received by the parallel-serial conversion circuit 31 from the lines $L_1$, $L_2$, $L_3$, $L_4$ and $L_5$ and the flip-flop 30 are converted into the serial signals Sx by the circuit. The serial signals Sx are repeatedly sent out from the conversion circuit 31 to the motor control circuit 13 for the right-hand door mirror unit and for the left-hand door mirror unit. When the mirror switch 25a is turned on to send out the turn-on signal Sa to the line $L_1$, and the changeover switch 26 remains turned on to send out the right-hand door mirror unit selection signal SR to enable the turning of the mirror 2 of the right-hand door mirror unit, the serial signals Sx include a factor corresponding to the selection signal SR, so that all the factors included in the serial signals Sx received by the serial-parallel conversion circuit 36 of the motor control circuit 13 are converted into the parallel signals. At that time, the conversion circuit 36 sends out the turn-on signal Sa to the line $M_1$ so that the transistor 42 receives the turn-on signal at its base in the drive circuit 38, and is consequently turned on so that the transistor 43 is subsequently turned on. As a result, the electrical current in the direction A shown in FIG. 3 is supplied from the power supply terminal 37 to the first electric motor 5 through the transistors 43 and 42 so that the motor is rotated forward to turn the mirror 2 up. This turning of the mirror 2 is continued until the mirror switch 25a is turned off to eliminate the turn-on signal Sa.

When the mirror switch 25b is turned and the right-hand door mirror unit selection signal SR remains sent out, the serial-parallel conversion circuit 36 sends out the turn-on signal Sb to the line $M_2$. As a result, the transistors 44 and 41 are sequentially turned on so that the electrical current in the direction reverse to A shown in FIG. 3 is supplied to the first electric motor 5 to rotate it backward to turn the mirror 2 down.

When the mirror switch 25c is turned on and the right-hand door mirror unit selection signal SR remains sent out, the turn-on signal Sc is sent out to the line $M_3$ so that the electrical current in the direction B shown in FIG. 3 is supplied to the second electric motor 9 to rotate it forward to turn the mirror 2 left.

When the mirror switch 25d is turned on and the right-hand door mirror until selection signal SR remains sent out, the turn-on signal Sd is sent out to the line $M_4$ so that the electrical current in the direction reverse to B is supplied to the second electric motor 9 to rotate it backward to run the mirror 2 right.

When the put-away switch 27 is turned on to send out the put-away command signal $S_1$ from the non-inversion output terminal Q of the T-type flip-flop 30 when the case 1 is in the use position, the motor control circuit 13 acts so that the serial-parallel conversion circuit 36 receives the serial signals Sx including the put-away command signal sent out from the parallel-serial conversion circuit 31, and then continuously sends out the put-away command signal to the line $M_5$. Since the case 1 is in the use position, the put-away detection switch 23 remains turned on so that the put-away command signal $S_1$ is supplied to the base of the transistor 58 of the drive circuit 40 to turn on the transistors 58 and 59 sequentially. As a result, the electrical current in the direction C shown in FIG. 3 is supplied from the power supply terminal 37 to the third electric motor 20 through the transistors 59 and 58 so that the motor is rotated forward to turn the case 1 toward the put-away position. When the case 1 is turned to the put-away position, the put-away detection switch 23 is turned off to eliminate the put-away command signal $S_1$ to turn off the transistors 59 and 58. As a result, the supply of the electrical current to the third electric motor 20 is ceased so that the case 1 is stopped in the put-away position. In this case, the case of the left-hand door mirror unit is also turned to the put-away position in the same manner.

In the above-described first embodiment, only four electric wires 16 of the electric cord 35 for connecting each mirror unit to the interior of the body of the motor vehicle are required to turn the mirror 2 of the mirror unit up and down and right and left and turn the case 1 of the unit between the put-away position and the use position under remote control from the driver's area of the vehicle. For that reason, the case 1, into which the electric cord 25 is laid, can be made compact, and the diameter of the hollow support shaft, through which the cord is laid, can also be made small to render the case more compact.

Figure 4:
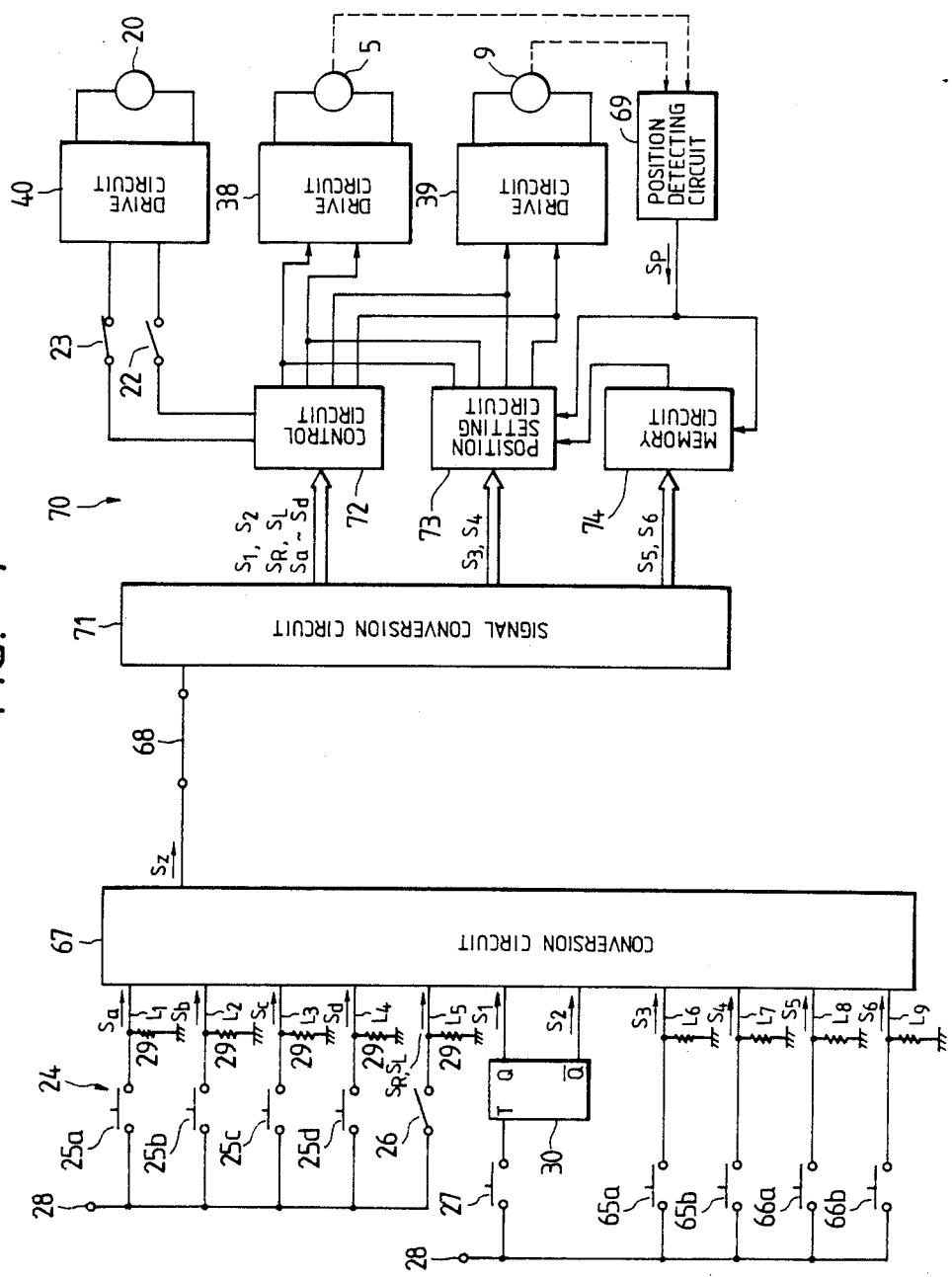
FIG. 4 shows an electric wiring diagram of an electric rearview mirror system which is a second embodiment of the present device.

FIG. 4 shows an electric wiring diagram of an electric rearview mirror system which is a second embodiment of the invention. Only the differences from the preceding embodiment will be described. Self-reset automatic turning switches 65a and 65b in FIG. 4 are provided as manipulation means on the dashboard of a motor vehicles so that automatic turning command signals $S_3$ and $S_4$, are sent out to lines $L_6$ and $L_7$ when the switches are turned on. Memory setting switches 66a and 66b of the self-reset type are provided as manipulation means in pairs with the automatic turning switches 65a and 65b so that setting command signals $S_5$ and $S_6$ are sent out to lines $L_8$ and $L_9$ when the memory setting switches are turned on. A parallel-serial conversion circuit 67 is provided as a transmission means in the body of the motor vehicle to receive turn-on signals Sa, Sb, Sc, Sd and a right-hand door mirror unit selection signal SR or a left-hand door mirror unit selection signal SL from a switch means 26 and a put-away command signal S1 or a return command signal $S_2$ from a T-type flip-flop 30, as well as the signals $S_3$, $S_4$, $S_5$ and $S_6$. The parallel-serial conversion circuit 67 is made of a microcomputer so that serial signals Sz generated by encoding the parallel signals received by the circuit are sent out to an electric wire 68. A position detector 69 is provided in the case of each mirror unit of the electric rearview mirror system. The detector 69 includes two permanent magnets attached to the first and second screw rods of the mirror drive mechanism of the mirror unit, and two magnetism sensors provided in appropriate static positions to face the movement loci of the permanent magnets position signals Sp are sent out from the position detector on the basis of the outputs from the magnetism sensors, indicative of the up-and-down and right-and-left positions of the mirror unit mirror.

Shown at 70 in FIG. 4 is a mirror control circuit provided in the case of the mirror unit. The circuit 70 is made of a microcomputer, but shown as a combination of functional block circuits in FIG. 4. The functional block circuits are a signal conversion circuit 71, a control circuit 72, a position setting circuit 73 and a memory circuit 74. The signal conversion circuit 71 receives the serial signals Sz from the electric wire 68 so that the circuit converts the received serial signals into parallel signals, classifies the parallel signals, and supplies them to the circuits 72, 73 and 74. Specifically, the signal conversion circuit 71 supplies the turn-on signals Sa, Sb, Sc and Sd, the right-hand door mirror unit selection signal SR or the left-hand door mirror unit selection signal SL, the put-away command signal $S_1$ or the return command signal $S_2$ to the control circuit 72, the automatic turning signals $S_3$ and $S_4$ to the position setting circuit 73, and the setting signals $S_5$ and $S_6$ to the memory circuit 74.

The control circuit 72 regulates the first, second and third electric motors of the mirror unit through drive circuits 38, 39 and 40 in the same manner as the serial-parallel conversion circuit 36 of the preceding embodiment.

The memory circuit 74 functions so that when the setting signals $S_5$ and $S_6$ are supplied to it, the position signals Sp from the position detector 69 are stored in different memory regions correspondingly to the automatic turning switches 66a and 66b.

The position setting circuit 73 functions so that when the automatic turning signals $S_3$ and $S_4$ are supplied to it, the position signals Sp stored in the memory regions of the memory circuit 74 and corresponding to the automatic turning signals $S_3$ and $S_4$ are read out from the memory regions to control the first and the second electric motors through the drive circuits 38 and 39 on the basis of the read-out position signals to turn the mirror to a position corresponding to the position signals. For that reason, if the position of the mirror is stored by the setting switches 66a and 66b in advance, the mirror can be turned to the stored position by the one-shot manipulation of the automatic turning switches 65a and 65b.

In the second embodiment shown in FIG. 4, only the signal transmission wire 68 and two power supply wires need to be laid to connect the mirror unit to the interior of the body of the motor vehicle. Therefore, the embodiment produces the same effect as the first embodiment, with one less connecting wire.

Figure 5:
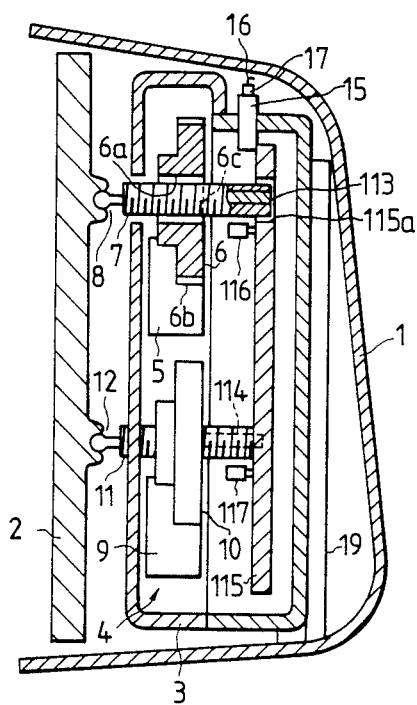
FIG. 5 shows a longitudinally sectional view of the right-hand door mirror unit of the mirror system, which is a second embodiment of the present invention.
Figure 6:
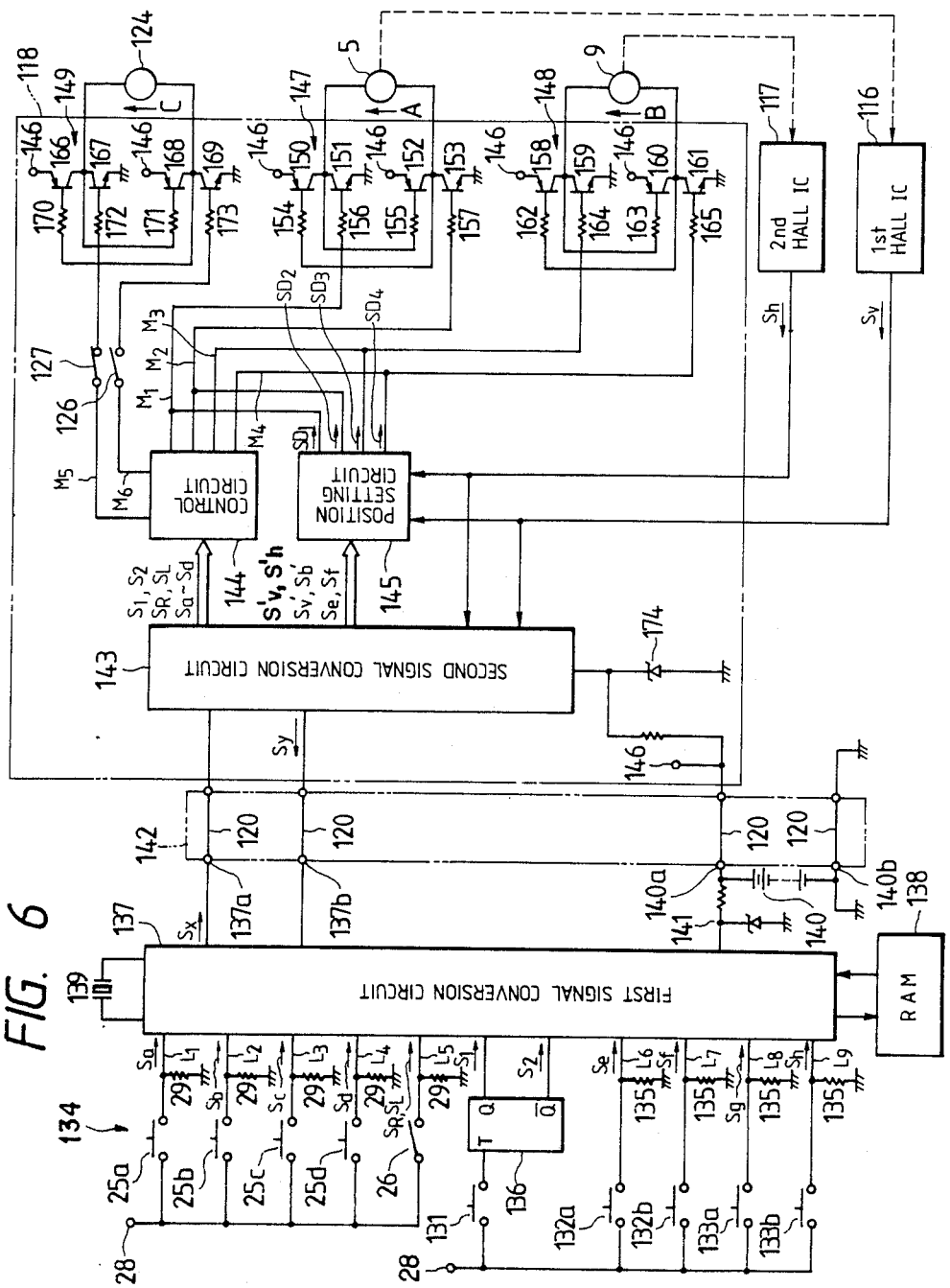
FIG. 6 shows an electric wiring diagram of an electric rearview mirror system which is the third embodiment of the present device.

FIGS. 5 and 6 show a third embodiment of the electric rearview mirror system according to the, present invention. In FIGS. 5 and 6, parts and components being the same in function as that shown in FIGS. 1 to 4 are designated by the same reference numerals. Therefore, the third embodiment will be described with respect merely to what is different from the foregoing embodiments.

FIG. 5 shows a right-hand mirror unit according to the third embodiment, including bar-shaped permanent magnets 113 and 114 that are embedded coaxially in the screw rods 7 and 11, and magnetized such that each of the magnets has north and south poles. A printed circuit board 115 is provided in the housing 3. The first and the second screw rods 7 and 11 are loosely inserted into the through holes 115a (only one of which is shown in FIG. 5) of the printed circuit board 15. A first Hall integrated circuit 116, which is a position sensor, is protrusively disposed on the printed circuit board 115 and located at a prescribed distance from the permanent magnet 113. A second Hall integrated circuit 117, which is a position sensor, is protrusively disposed on the printed circuit board 115 and located at a prescribed distance from the permanent magnet 114. The first Hall integrated circuit 116 sends out a position signal Sv indicative of the position of the first screw rod 7 or the up-and-down position of the mirror 2. The second Hall integrated circuit 117 sends out a position signal Sh indicative of the position of the second screw rod 11 or the right-and-left position of the mirror 2.

The electric circuit configuration of the electric rearview mirror system is now described with reference to FIG. 6. A switch means 134 is provided as a manipulation means on the dashboard of the motor vehicle. Self-reset return switches 132a and 132b are provided as manipulation means on the dashboard of the vehicle. Memory setting switches 133a and 133b of the self-reset type are provided as manipulation means on the dashboard of the vehicle, in pairs with the return switches 132a and 132b. One terminal of each of the switches 25a, 25b, 25c, 25d, 26, 132a, 132b, 133a, 133b, and 131 is connected to a power supply terminal 28 of +5 V in potential, and the other terminals of the switches are connected to signal lines $L_1$, $L_2$, $L_3$, $L_4$, $L_5$, $L_6$, $L_7$, $L_8$ and $L_9$ grounded through different resistors 29, or the input to the T-type flip-flop 136, respectively.

Automatic turning signals Se and Sf, which are high-level command signals, are sent out to the signal lines $L_6$ and $L_7$ when their respective return switches 132a and 132b are turned on. Setting signals Sg and Sh, also high-level command signals, are sent out to the signal lines $L_8$ and $L_9$ when their respective memory setting switches 133a and 133b are turned on.

A first signal conversion circuit 137 is provided as a first control means in the body of the motor vehicle. A random access memory 138 is provided as a memory means in the body of the vehicle. The circuit 137 and the memory 138 are made of a single-chip central processing unit. The signals supplied frOm the signal lines $L_1$, $L_2$, $L_3$, $L_4$ and $L_5$ and the flip-flop 136 to the first signal conversion circuit 137 are entered in parallel with each other into the circuit so that the circuit converts the parallel signals into serial signals Sx in a sequence determined on the basis of clock pulses from an oscillation circuit 139. The serial signals Sx are repeatedly sent out from the first signal conversion circuit 137. When the circuit 137 is supplied with the setting signals Sg and Sh from the memory setting switches 133a and 133b, the circuit acts so that combinations of position signals Sv and Sh supplied from the Hall integrated circuits 116 and 117 are stored as original position signals S'v and S'h corresponding to the return switches 132a and 132b, in mutually different storage regions in the random access memory 138. When the circuit 137 is supplied with the automatic turning signals Se and Sf from the return switches 132a and 132b, the combination of original position signals S'v and S'h, stored in the random access memory 138 and corresponding to the automatic turning signals, are read out from the memory by the circuit 137. Then read-out signals and the automatic turning signals are sent out as the serial signals Sx from the circuit. The circuit 137 is supplied with electric power from a vehicle-mounted battery 140 through a constant voltage circuit 141.

The motor control circuit 118, provided on the printed circuit board 115, is made of a singlechip central processing unit, but shown as a combination of functional block circuits in FIG. 6. The circuit 118 is connected to the output terminal 137a and input terminal 137b of the first signal conversion circuit 137, and the output terminals 140a and 140b of the vehicle-mounted battery 140 through an electric cord 142 including the electric wires 120 and the plug 17 and laid through the hollow support shaft. The motor control circuit 118 includes a second signal conversion circuit 143, which receives the serial signals Sx and converts them back into the parallel signals. The second signal conversion circuit 143 classifies the parallel signals and then supplies them to a control circuit 144 and a position setting circuit 145. Specifically, the second signal conversion circuit 143 supplies the turn-on signals Sa, Sb, Sc and Sd, the right-hand door mirror unit selection signal SR (the left-hand door mirror unit selection signal SL for the left-hand door mirror unit), the put-away command signal $S_1$ and the return command signal $S_2$ to the control circuit 144. The output of the put-away command signal $S_1$ and the return command signal $S_2$ from the second signal conversion circuit 143 is latched. When the serial signals Sx do not include a factor corresponding to the right-hand door mirror unit selection signal SR, the conversion of factors corresponding to the turn-on signals Sa, Sb, Sc and Sd is stopped so that low-level signals are always sent out to the control circuit 144. The second signal conversion circuit 143 supplies the automatic turning signals Se and Sf and the original position signals S'v and S'h to the position setting circuit 145.

The second signal conversion circuit 143 also receives the position signal Sv and Sh from the first and the second Hall integrated circuits 116 and 117, converts the signals into serial signals Sy, and sends them out to the first signal conversion circuit 137, which converts the serial signals back into the position signals Sv and Sh so that the position signals are stored as the original position signals S'v and S'h in the random access memory 138 depending on the manipulation of the memory setting switches 133a and 133b.

The control circuit 144 functions so that the signals Sa, Sb, Sc, Sd, $S_1$ and $S_2$ supplied from the second signal conversion circuit 143 to the control circuit are sent out to lines $M_1$, $M_2$, $M_3$, $M_4$, $M_5$ and $M_6$, respectively.

The position setting circuit 145 receives the position signals Sv and Sh from the first and the second Hall integrated circuits 116 and 117 so that when the automatic turning signals Se and Sf are supplied to the position setting circuit, drive signals $SD_1$, $SD_2$, $SD_3$ and $SD_4$, which are high-level signals, are selectively sent out to the lines $M_1$, $M_2$, $M_3$ and $M_4$ until the original position signals S'v and S'h from the second signal conversion circuit 143 coincide with the position signals Sv and Sh from the Hall integrated circuits.

The motor control circuit 118 also includes a power supply terminal 146 connected to the output terminal 140a of the vehicle-mounted battery 140 through the electric cord 142, a grounded terminal paired with the power supply terminal and connected to the other output terminal 140b of the battery through the cord, a drive circuit 147 for driving the first electric motor 5, a drive circuit 148 for driving the second electric motor 9, and a drive circuit 149 for driving the third electric motor 124.

In the drive circuit 147, a series circuit composed of the emitter and collector of a PNP transistor 150 and the collector and emitter of an NPN transistor 151 and a series circuit composed of the emitter and collector of a PNP transistor 152 and the collector and emitter of an NPN transistor 153 are connected between the power supply terminal 146 and the grounded terminal, and the first electric motor 5 is connected between the collectors of the transistors 150 and 152. The base of the transistor 150 is connected to the collector of the transistor 153 through a resistor 154. The base of the transistor 152 is connected to the collector of the transistor 151 through a resistor 155. The base of the transistor 151 is connected to the line $M_1$ through, a resistor 156. The base of the transistor 153 is connected to the line $M_2$ through a resistor 157. When an electrical current in a direction A shown in FIG. 6 is supplied to the first electric motor 5, the motor is rotated forward so that the mirror 2 is turned up. When an electrical current in a direction reverse to that A is supplied to the motor 5, the motor is rotated backward so that the mirror 2 is turned down.

In the drive circuit 148, the second electric motor 9, transistors 158, 159, 160 and 161 and resistors 162 and 163 are connected between the power supply terminal 146 and the grounded terminal in the same manner as the drive circuit 147, and the bases of the transistors 159 and 161 are connected to the lines M3 and M4 through resistors 164 and 165, respectively. When an electrical current in a direction B shown in FIG. 6 is supplied to the second electric motor 9, the motor is rotated forward to that the mirror 2 is turned left. When an electrical current in a direction reverse to that B is supplied to the motor 9, the motor is rotated backward so that the mirror 2 is turned right.

In the drive circuit 149, the third electric motor 124, transistors 166, 167, 168 and 169 and resistors 170 and 171 are connected between the power supply terminal 146 and the grounded terminal in the same manner as the drive circuit 147, the base of the transistor 167 is connected to the line $M_5$ through a resistor 172 and the put-away detection switch 127, and the base of the transistor 169 is connected to the line $M_6$ through a resistor 173 and the return detection switch 126. When an electrical current in a direction C shown in FIG. 6 is supplied to the third electric motor 124, the motor is rotated forward so that the case 1 is turned toward the put-away position. When an electrical current in a direction reverse to that C is supplied to the third motor 124, the motor is rotated backward so that the case 1 is turned toward the use position.

The motor control circuit 118 is supplied with electric power from the vehicle-mounted battery 140 through a constant voltage circuit 174.

A motor control circuit (not shown in the drawings) for the left-hand door mirror unit of the electric rearview mirror system and an electric cord (not shown in the drawings) for the motor control circuit are constructed in the same manner as the above-described motor control circuit 118 and the above-described electric cord 143, respectively. The second signal conversion circuit of the motor control circuit for the left-hand door mirror unit functions so that the conversion of factors corresponding to the turn-on signals Sa, Sb, Sc and Sd is stopped when the serial signals Sx received by the second signal conversion circuit through the electric cord do not include a factor corresponding to the left-hand door mirror unit selection signal SL.

The operation of the electric rearview mirror system is now described in detail. The parallel signals received by the first signal conversion circuit 137 from the lines $L_1$, $L_2$, $L_3$, $L_4$, $L_5$, $L_6$, $L_7$, $L_8$ and $L_9$ and the T-type flip-flop 136 are converted into the serial signals Sx by the circuit. The circuit 137 repeatedly sends out the serial signals Sx to the motor control circuit 118 for the right-hand door mirror unit and the motor control circuit for the left-hand door mirror unit. When the mirror switch 25a is turned on to send out the turn-on signal Sa to the Line $L_1$ as the changeover switch 26 remains turned on to send out the right-hand door mirror unit selection signal SR to enable the turning of the mirror 2 of the right-hand door mirror unit, all the factors included in the serial signals Sx received by the second signal conversion circuit 143 of the motor control circuit 118 are converted into the parallel signals by the second signal conversion circuit because the serial signals include a factor corresponding to the right-hand door mirror unit selection signal. At that time, since the control circuit 144 sends out the turn-on signal Sa to the line $M_1$, the transistor 151 receives the turn on signal at the base of the transistor in the drive circuit 147 and is consequently turned on so that the transistor 152 is also turned on. As a result, the electrical current in the direction A shown in FIG. 6 is supplied from the power supply terminal 146 to the first electric motor 5 through the transistors 152 and 151 so that the motor is rotated forward to turn the mirror 2 up. This turning of the mirror 2 is continued until the mirror switch 25a is turned off to eliminate the turn-on signal Sa.

When the mirror switch 25b is turned on as the right-hand door mirror unit selection signal SR remains sent out, the turn-on signal Sb is sent out from the control circuit 144 to the line $M_2$. As a result, the transistors 153 and 150 are sequentially turned on so that the electrical current in the direction reverse to that A shown in FIG. 6 is supplied to the first electric motor 5 to rotate it backward to turn the mirror 2 down.

When the mirror switch 25c is turned on as the right-hand door mirror unit selection signal SR remains sent out, the turn-on signal Sc is sent out from the control circuit 144 to the line $M_3$. As a result, the electrical current in the direction B shown in FIG. 6 is supplied to the second electric motor 9 to rotate it forward to turn the mirror 2 left.

While the mirror switch 25d is turned on as the right-hand door mirror unit selection signal SR remains sent out, the turn-on signal Sd is sent out from the control circuit 144 to the line $M_4$. As a result, the electrical current in the direction reverse to that B shown in FIG. 6 is supplied to the second electric motor 9 to rotate it backward to turn the mirror 2 right.

While the return switch 132a is turned on as the mirror 2 remains turned to a prescribed position by the above-described manipulation, the automatic turning signal Se and the original position signals S'v and S'h are supplied from the second signal conversion circuit 143 to the position setting circuit 145. As a result, the position setting circuit 145 selectively supplies the drive signals $SD_1$, $SD_2$, $SD_3$ or/and $SD_4$ to the lines $M_1$, $M_2$, $M_3$ Or/and $M_4$ depending on the results of comparison off the original position signals S'v and S'h with the position signals Sv and Sh sent out from the first and the second hall integrated circuits 116 and 117 in a real-time manner, so that the mirror 2 is turned to a position corresponding to the original position signals S'v and S'h.

When the return switch 132b is turned on as the mirror 2 remains turned to the prescribed position, the position setting circuit 145 acts to turn the mirror to a position corresponding to the original position signals S'v and S'h, in the same manner as the above.

For these reasons, if positions are stored for the mirror 2 by the memory setting switches 133a and 133b in advance, the mirror can be turned to the stored positions by the one-shot manipulation of the return switches 132a and 132b, respectively.

When the put-away switch 131 is turned on to send out the put-away command signal S1 from the non-inversion output terminal Q of the flip-flop 136 as the case 1 of the right-hand door mirror unit is in the use position, the motor control circuit 118 acts so that the first signal conversion circuit 137 sends out the serial signals Sx including the put-away command signal S1, and the control circuit 144 continuously sends out the put-away command signals to the line $M_5$ is response to the output of the serial signals. Since the put-away detection switch 127 remains turned on as the case 1 is in the use position, the put-away command signal S1 is supplied to the base of the transistor 167 of the drive circuit 149 so that the transistors 167 and 16 are sequentially turned on. As a result, the electrical current in the direction C shown in FIG. 6 is supplied from the power supply terminal 146 to the third electric motor 124 through the transistors 168 and 167 so that the motor is rotated forward to turn the case 1 toward the put-away position. When the case 1 is turned to the put-away position, the put-away detection switch 127 is turned off to eliminate the put-away command signal $S_1$ to turn off the transistors 168 and 169. As a result, the supply of the electrical current to the third electric motor 124 is ceased to stop the case 1 in the put-away position. In this case, the case of the left-hand door mirror unit is also similarly turned to a put-away position.

When the put-away switch 131 is turned on to send out the return command signal S2 from the inversion output terminal Q of the flip-flop 136 as the case 1 is in the use position, the control circuit 144 continuously sends out the return command signal to the line $M_6$. At that time, since the return detection switch 126 remains turned on, the transistors 169 and 166 of the drive circuit 149 are sequentially turned on so that the electrical current in the direction reverse to that C shown in FIG. 6 is supplied to the third electric motor 124. As a result, the motor 124 is rotated backward so that the case 1 is turned toward the use position. This turning of the case 1 is ceased when the case has reached the use position so that the return detection switch 126 is turned off. In this case, the case of the left-hand door mirror unit is also similarly turned to a use position.

In the above-described third embodiment, only four electric wires 120 of the electric cord 142 are required to connect the mirror unit to the interior of the motor vehicle so that turning the mirror 2 of the mirror unit up and down and right and left by manipulating the mirror switches 25a, 25b 25c and 25d and the return switches 132a and 132b and turning the case 1 of the unit between the put-away position and the use position by manipulating the put-away switch 131 can be performed under remote control in the driver's area of the motor vehicle. For that reason, the electric cord 142 can be easily handled to improve the manufacturing property of the electrical rearview mirror system and the case 1, into which the electric cord 142 is laid, can be made compact. In addition, the diameter of the support shaft, through which the electric cord 142 is laid, can be made small to make the case 1 more compact. Since desired positions for the mirror 2 of the right-hand door mirror unit and that of the left-hand door mirror unit can be collectively stored in the random access memory 138 provided in the body of the motor vehicle, the construction of the mirror system is simpler than that of an electric rearview mirror system in which random access memories are provided in the right-hand and left-hand door mirror units. In addition, the motor control circuit 118 can be made of the single-chip central processing unit of low capacity. The cost of production of the mirror system of the embodiment can thus be reduced.

The present device is not confined to the abovedescribed embodiment, but may be embodied or practiced in other various ways- without departing from its spirit or essential character.

According to the present device, drive mechanisms, which have a function of turning the mirrors of the mirror units of an electric rearview mirror system for a motor vehicle and a function of turning the cases of the mirror units back and forth between a use position and a put-away position, are provided in the cases so that the drive mechanisms are remotely controlled by a plurality of kinds of command signals supplied from manipulation means provided in the body of the motor vehicle. However, the number of electric wires for connecting each mirror unit to the interior of the body of the motor vehicle can be made small to render the case of the unit compact. Practical effects are thus produced.

Moreover, according to the present device, drive mechanisms for turning the mirrors of the mirror units of an electric rearview mirror system for a motor vehicle and a memory means for storing position signals indicative of the turned positions of the mirrors are provided in the cases of the mirror units so that the drive mechanisms are operated in prescribed manners on the basis of a plurality of kinds of command signals supplied from manipulation means provided in the body of the vehicle, and the position signals stored in the memory means. However, the number of electric wires necessary to connect each mirror unit to the interior of the body of the motor vehicle can be made small enough to improve the manufacturing property of the mirror system, render the case of the mirror unit compact and reduce the cost of production of the system. Practical effects are thus produced.

What is claimed is:

1. An electric rearview mirror system for a motor vehicle body, comprising:
    a mirror unit having a mirror body;
    means for housing said mirror unit;
    means for driving said mirror body, said driving means being provided in said housing means;
    switch means, provided in the vehicle body, for providing parallel command signals;
    first control means, provided in the vehicle body, for converting said parallel command signals into a serial command signal;
    second control means, provided in said housing means, for converting said serial command signal into parallel driving signals; and
    operating means, enabled by said parallel driving signals, for operating said driving means.

2. The electric rearview mirror system of claim 1, wherein said first control means and said second control means are connected to each other by electric wires.

3. The electric rearview mirror system of claim 1, further comprising:
    means for detecting a position of said mirror body, said position detecting means being provided in said housing means; and
    means for storing a position signal from said position detecting means, said storing means being provided in the vehicle body.

4. The electric rearview mirror system of claim 3, wherein said position signal stored in said storing means is converted by said first control means into a serial signal that is transmitted to said second control means, and then to said operating means; and
    said position signal from said detecting means is transmitted to said operating means, and converted by said second control means to a serial signal that is transmitted to said first control means and then to said storing means.

5. THe electric rearview mirror system of claim 3, wherein said position detecting means comprises at least one hall element.

6. The electric rearview mirror system of claim 1, further comprising:
    means for detecting a position of said mirror body, said position detecting means being provided in said housing means; and
    means for storing a position signal from said position detecting means, said storing means being provided in said housing means.

7. The electric rearview mirror system of claim 8, wherein said position detecting means transmits signals to said operating means and to said storing means;
    said storing means transmits signals to said operating means; and
    said second control means, responding to the serial input from said first control means, transmits signals to said storing means.

8. The electric rearview mirror system of claim 1, wherein said first control means consists of a microcomputer in the vehicle body, and said second control means consists of a microcomputer in said housing means.

* * * * *